US011396583B2

(12) United States Patent
Probst et al.

(10) Patent No.: US 11,396,583 B2
(45) Date of Patent: Jul. 26, 2022

(54) PROCESS FOR THE PREPARATION OF A POLYTHIOETHERSULFIDE

(71) Applicant: NOURYON CHEMICALS INTERNATIONAL B.V., Arnhem (NL)

(72) Inventors: Christian Probst, Plauen (DE); Volker Burkhardt, Mörfelden-Walldorf (DE); Olaf Klobes, Greiz (DE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 235 days.

(21) Appl. No.: 16/886,868

(22) PCT Filed: Dec. 4, 2018

(86) PCT No.: PCT/EP2018/083510
§ 371 (c)(1),
(2) Date: May 29, 2020

(87) PCT Pub. No.: WO2019/110598
PCT Pub. Date: Jun. 13, 2019

(65) Prior Publication Data
US 2021/0363303 A1   Nov. 25, 2021

(30) Foreign Application Priority Data
Dec. 7, 2017   (EP) .................................... 17205865

(51) Int. Cl.
| C08G 75/12 | (2016.01) |
| C08G 75/04 | (2016.01) |
| C08K 5/1515 | (2006.01) |
| C08K 5/17 | (2006.01) |

(52) U.S. Cl.
CPC ............ C08G 75/12 (2013.01); C08G 75/04 (2013.01); C08K 5/1515 (2013.01); C08K 5/17 (2013.01)

(58) Field of Classification Search
CPC ........ C08G 75/00; C08G 75/02; C08G 75/04; C08G 75/12; C08K 5/1515; C08K 5/17
See application file for complete search history.

(56) References Cited

U.S. PATENT DOCUMENTS

| 5,225,472 A | 7/1993 | Cameron et al. |
| 2004/0247792 A1 | 12/2004 | Sawant et al. |
| 2006/0175005 A1 | 8/2006 | Sawant et al. |

FOREIGN PATENT DOCUMENTS

| JP | S6436622 A | 2/1989 |
| JP | H07507773 A | 8/1995 |
| JP | 200050975 A | 8/2000 |
| JP | 2002544306 A | 12/2002 |
| JP | 2004502826 A | 1/2004 |
| JP | 2006526693 A | 11/2006 |
| JP | 2008530270 A | 8/2008 |
| JP | 2016527361 A | 9/2016 |
| WO | 9839365 A2 | 9/1998 |
| WO | 0068297 A1 | 11/2000 |
| WO | 200166621 A1 | 9/2001 |
| WO | 0202710 A2 | 1/2002 |
| WO | 2015014876 A2 | 2/2015 |
| WO | 2016130673 A1 | 8/2016 |

OTHER PUBLICATIONS

Cerritelli, S., et al.; Biomacromolecules, 2007, vol. 8, p. 1966-1972.*
Shankara, G.K.; Sulfur Containing Biologically Responsive Polymers Synthesized via Thiol-yne/ene and Thiol-Epoxide Ring Opening Polymerization, 2015, p. i-106.*
EPO, Extended European Search Report issued in European Application No. 17205865.3, dated Jun. 6, 2018.
ISA-EPO, International Search Report issued in International Application No. PCT/EP2018/083510, dated Dec. 21, 2018.

* cited by examiner

*Primary Examiner* — Robert S Jones, Jr.
(74) *Attorney, Agent, or Firm* — Lorenz & Kopf, LLP

(57) ABSTRACT

Process for the production of a liquid mercapto-terminated polythioethersulfide comprising the step of reacting, at a temperature in the range 0-100° C. and in the presence of a catalyst:
  at least one compound selected from the group consisting of (i) dimercapto-dioxa-alkanes (DMDAs) and (ii) glycol di(mercapto carboxylic acid ester)s (GDMEs),
  at least one dimercapto-dialkyl sulfide (DMDS)
  at least one di-epoxide, and
  optionally at least one branching agent selected from compounds having at least three terminal groups selected from epoxy and mercapto groups,
wherein the molar ratio (DMDA+GDME)/DMDS is in the range 1.1-4.0.

20 Claims, No Drawings

PROCESS FOR THE PREPARATION OF A POLYTHIOETHERSULFIDE

CROSS-REFERENCE TO RELATED APPLICATION

This application is a U.S. National-Stage entry under 35 U.S.C. § 371 based on International Application No. PCT/EP2018/083510, filed Dec. 4, 2018, which was published under PCT Article 21(2) and which claims priority to European Application No. 17205865.3, filed Dec. 7, 2017, which are all hereby incorporated in their entirety by reference.

TECHNICAL FIELD

The present invention relates to a process for the preparation of a liquid mercapto-terminated polythioethersulfide, i.e. a polymer containing both ether and thioether groups. In particular, the invention includes a process for making a polythioethersulfide by reacting di-mercapto-terminated compounds with a di-epoxy compound.

BACKGROUND

Sulfur-containing polymers are valuable intermediates for formulating epoxies, polythiourethanes and acrylics, especially for their use in coatings, elastomers, and adhesives, or as sealants.

These polymers preferably have mercapto end-groups, because that allows them to be applied in systems that use oxidative curing methods and makes them more reactive towards epoxies and isocyanates.

In order to improve their ease of handling, mixing, and formulating, the sulfur-containing polymers are preferably liquid at room temperature.

Commercial sealants use liquid mercapto-terminated polysulfide polymers prepared by condensation polymerization of bis(chloroethyl)formal and sodium polysulfide. Unfortunately, these polymers have many thermally sensitive S—S linkages, which make sealants derived from these polymers unsuitable for high temperature applications.

Polysulfides containing S—S linkages also suffer from so-called "cold-flow": the reduced ability to recover their original shape after release from deforming compression forces and the tendency to recover during the application of those forces.

WO 2015/014876 already addressed this problem and provided a mercapto-terminated liquid polymer with the formula HS—R—(Sy-R)t-SH, wherein y has an average value in the range 1.0-1.5. This polymer is obtained by first reacting a bis(haloalkyl)formal with alkali polysulfide of the average formula M2Sx, wherein M is an alkali metal and x is an average value in the range from 1.04 to 1.8, reacting said polymer with a reducing agent in an aqueous reaction mixture, thereby reductively splitting polysulfide linkages, and lowering the pH of the mixture to below 6.0 by adding an acid. The polymers obtained in the experimental section had an average value of y of 1.3, meaning that the polymer did contain S—S linkages and still suffered from cold flow, although to a lesser extent than regular polysulfide polymers.

JPS64036622-A discloses the preparation of a mercapto group-containing polymer that, allegedly, has outstanding moisture resistance. Said polymer is prepared by reacting a polyepoxide with a polythiol. The polyepoxide can be aliphatic or aromatic (e.g. a bisphenol A-type epoxide), whereas the polythiol is polyglycol dimercaptan or a thiopolyglycol dimercaptan.

In the experimental section of this reference, either a triglycol dimercaptan or a thiodiglycol dimercaptan was used as the polythiol. However, as shown in the experimental section below, the use of thiopolyglycol dimercaptans as the only polythiol causes the polymers to gel at room temperature.

JPS64036622-A furthermore discloses a formula of a polymer built up from 1 molecule diglycol dimercaptan, 1 molecule thiodiglycol dimercaptan, and 1 molecule neopentyl glycidyl ether. This is a very small molecule, which means that its elongation and its control of hardness, rigidity, and viscoelasticity are limited. For such small molecules, curing will require a lot of curing agent, meaning that the properties of the cured polymer will be dominated by the curing agent.

Furthermore, as shown in the experimental section below, a 1:1 ratio of diglycol dimercaptan to thiodiglycoldimeracptan leads to a polymer with mechanical properties that require improvement.

The object of the present invention is to provide a process for the preparation of a mercapto-terminated liquid polymer that does not contain S—S linkages.

A further object of the present invention is the provision of a process for the preparation of a mercapto-terminated liquid polymer that does not require a splitting step.

A further object of the present invention is the provision of a process for the preparation of a mercapto-terminated liquid polymer that can be performed as a one pot reaction and does not require acidification and/or washing steps.

An additional object of the present invention is the provision of a process for the preparation of a mercapto-terminated liquid polymer with improved shore-A hardness and tensile strength, while maintaining sufficient elongation at break. In addition, other objects, desirable features and characteristics will become apparent from the subsequent summary and detailed description, and the appended claims, taken in conjunction with the accompanying drawings and this background.

SUMMARY

These objects are met by preparing a mercapto-terminated polymer using the process of the present invention, which comprises the step of reacting, at a temperature in the range 0-100° C. and in the presence of a catalyst:

- at least one compound selected from the group consisting of (i) dimercapto-dioxa-alkanes (DMDAs) of the formula HS—$(C_nH_{2n}$—O$)_p$—$C_nH_{2n}$—O—$C_nH_{2n}$—SH, wherein each n is independently selected from integers in the range 1-8, and p ranges from 0 to 10 and (ii) glycol di(mercapto carboxylic acid ester)s (GDMEs),
- at least one dimercapto-dialkyl sulfide (DMDS) of the formula HS—$(C_mH_{2m}$—S$)_q$—$C_mH_{2m}$—S—$C_mH_{2m}$—SH wherein each m is independently selected from integers in the range 1-8, preferably 1-6, and most preferably 1-3, and q ranges from 0 to 10,
- at least one di-epoxide, and
- optionally at least one branching agent selected from compounds having at least three terminal groups selected from epoxy and mercapto groups, wherein the molar ratio (DMDA+GDME)/DMDS is in the range 1.1-4.0.

The polymer resulting from this process not only solves the above-mentioned problems, it also turns out to have a very low mercaptan odor level compared to other mercaptan-terminated polymers, is colorless, and has a water-like clarity.

DESCRIPTION

The following detailed description is merely exemplary in nature and is not intended to limit the invention or the application and uses of the invention. Furthermore, there is no intention to be bound by any theory presented in the preceding background of the invention or the following detailed description.

The dimercapto-dioxa-alkane (DMDA) has the formula HS—$(C_nH_{2n}-O)_p-C_nH_{2n}-O-C_nH_{2n}$-SH, wherein each n is independently selected from integers in the range 1-8, preferably 1-6, and most preferably 1-3, and p ranges from 0 to 10.

Examples of suitable DMDAs are 1,8-dimercapto-3,6-dioxaoctane (DMDO), 1,7-dimercapto-3,5-dioxaheptane (DMDH), 1,7-dimercapto-3,5-dioxaheptane, hexa(ethylene glycol) dithiol, tetra(ethylene glycol) dithiol, and 2,2'-(propane-1,3-diylbis(oxy))diethanethiol.

Examples of glycol di(mercapto carboxylic acid ester)s (GDMAs) are glycol di(mercaptoacetic acid ester) and glycol di(3-mercaptopropionic acid ester).

Most preferably, at least one DMDA is used in the process of the present invention. The most preferred DMDA is DMDO.

The dimercapto-dialkyl sulfide (DMDS) has the formula HS—$(C_mH_{2m}-S)_q-C_mH_{2m}-S-C_mH_{2m}$-SH wherein each m is independently selected from integers in the range 1-8, preferably 1-6, and most preferably 1-3, and q ranges from 0 to 10.

Examples of suitable DMDSs are 2,2'-dimercaptodiethyl sulfide, 3,5-dithia-1,7-heptanedithiol, 3,7-dithia-1,9-nonanedithiol, and 3,6,9-trithiaundecane-1,11-dithiol. The most preferred DMDS is 2,2'-dimercaptodiethyl sulfide.

The di-epoxide can be aliphatic or aromatic. Aliphatic di-epoxides are cheaper and more reactive, whereas aromatic di-epoxides lead to high viscosity polymers with low UV stability. Aliphatic di-epoxides are therefore preferred.

Examples of suitable aliphatic di-epoxides are butanediol diglycidyl ether, hexanediol diglycidyl ether, polypropylene glycol diglycidyl ether, diglycidyl ether, poly(propylene) diglycidyl ether, neopentyl glycol diglycidyl ether, and mixtures thereof.

Examples of aromatic di-epoxides are isopropylidenediphenol diclycidyl ether (BADGE), bisphenol A, bisphenol F, and mixtures thereof.

In one embodiment, a branching agent is used in the process of the present invention. A branching agent is a compound having at least three terminal groups selected from epoxy and mercapto groups. The use of a branching agent will result in a branched polymer, which further improves the mechanical properties of the resulting polymer.

Examples of suitable branching agents are triglycidyl ether trimethylol propane, glycerol triglycidyl ether, trimethylolpropane (3-mercaptopropionate), and 2,3-bis((2-mercaptoethyl)thio)-1-propanethiol, and pentaerythrityl tetrathiol.

The amount of branching agent preferably ranges from 0 to 25 mol %, more preferably from 5 to 25 mol %, and most preferably from 10 to 25 mol %, relative to the total molar amount of DMDA, GDMA, DMDS, and branching agent.

The (DMDA+GDMA)/DMDS molar ratio is in the range 1.1-4.0, preferably 1.2-4.0, more preferably 1.5-3.0. It has been found that within this ratio, polythioethers with optimum shore-A hardness and tensile strength are obtained, while maintaining satisfactory elongation at break. That is rather unexpected, since the elongation at break normally tends to decrease with increased tensile strength.

The total amount DMDA, GDMA, and DMDS preferably ranges from 1.05 to 1.55 mol %, more preferably from 1.15 to 1.55 mol %, even more preferably from 1.25 to 1.55 mol %, and most preferably from 1.25 to 1.40 mol %, relative to the total amount of di-epoxide.

Suitable catalysts include tertiary amines, tertiary phosphines, imidazoles, and lewis acids.

Examples of suitable tertiary amine catalysts are 1,4-diazabicyclo[2.2.2]octane (DABCO; also called tri-ethylenediamine), tetramethylguanidin, tetramethylimino-bispropylamine, 1,3,5-tris[3-(dimethylamino)-propyl]hexahydro-1,3,5-triazine, bis(2-dimethylamino-ethyl)ether, N,N-dimethylcyclohexanamine, tetramethyliminobispropylamine, dimethyl-aminomethyl phenol, and tris(dimethylaminomethyl)phenol, An example of a suitable tertiary phosphine catalyst is triphenyl phosphine.

Examples of suitable imidazole catalysts are 2-methylimidazole, 2-ethyl1-4-methyl-imidazole, and 2-phenyl-imidazole.

Examples of suitable lewis acid catalysts are dicyanodiamide, boron trifluoride, zinc dichloride, tin tetrachloride, iron trichloride, aluminum trichloride, and their amine complexes.

The catalyst is preferably present in an amount of 0.01-0.1, preferably 0.01-0.05, most preferably 0.01-0.025 mol % relative to all dimercapto compounds (i.e. DMDA, GDMA, DMDS, and mercapto-terminated branching agent).

The process of the present invention is preferably conducted at a temperature in the range 0-100° C., preferably 15-80° C., and most preferably 20-70° C.

The reaction is preferably conducted in an organic solvent. Examples of suitable solvents are toluene, xylene, benzene, cyclohexane, heptane, pentane, cyclopentane, 1,4-dioxane, chloroform and diethyl ether, tetrahydrofurane, and ethyl acetate.

The amount of solvent is typically less than 50 wt %, more preferably less than 10-50 wt %, and most preferably 15-25 wt %, relative to the weight of the total reaction mixture.

The reactants can be added to the reactor in any order. It is, however preferred to add the catalyst as the last ingredient and thoroughly mix all other ingredients before addition of the catalyst.

The mercapto-terminated polymer is liquid at room temperature. The number average molecular weight (determined by GPC with polystyrene standards) is preferably in the range 1,000-25,000, more preferably 1,000-6,500, even more preferably in the range 1,000-4,000, and most preferably in the range 1,000-3,000 g/mol.

The resulting polymer has various applications, including the use as binder in sealants, adhesives, and coating compositions (for instance top coatings for aircrafts, marine antifouling coatings, pipeline coatings, anti-corrosion coatings, and intumescent coatings), in isocyanate cure, in epoxy-resin cure, and in acrylate resin cure.

EXAMPLES

The following compounds were mixed in toluene, in a three-necked flask equipped with a thermometer and a mechanical stirrer: 1,8-dimercapto-3,6-dioxaoctane (a DMDA), 2,2'-dimercaptodiethyl sulfide (a DMDS), 2,3-bis (2-mercaptoethyl)thio)-1-proanethiol (a branching agent), and butanediol diglycidyl ether (a di-epoxide).

The catalyst triethylene diamine (Tegoamin® 33) was added under vigorous stirring.

After the initial temperature rise, the reaction mixture was heated to 60° C. The reaction was considered completed after 3 hours.

Different amounts of reactants were used, as displayed in Table 1.

TABLE 1

| | DMDA/DMDS molar ratio | | | | | | | | | | |
|---|---|---|---|---|---|---|---|---|---|---|---|
| | no DMDS | | 0.5 | | 1.0 | | 1.4 | | 1.9 | | 3.0 | |
| | Amount | | Amount | | Amount | | Amount | | Amount | | Amount | |
| Raw material | g | % | g | % | g | % | g | % | g | % | g | % |
| DMDA | 64 | 36.2 | 66 | 9.2 | 438 | 17.9 | 153 | 20.0 | 171 | 22.1 | 197 | 25.0 |
| DMDS | 0 | 0 | 167 | 23.5 | 371 | 15.2 | 93 | 12.3 | 78 | 10.1 | 56 | 7.1 |
| Branching agent | 11 | 6.3 | 27 | 3.9 | 183 | 7.5 | 64 | 8.4 | 71 | 9.3 | 82 | 10.5 |
| Tegoamin 33 | 0.8 | 0.5 | 1 | 0.1 | 5 | 0.2 | 2 | 0.2 | 2 | 0.3 | 2 | 0.3 |
| di-epoxide | 70 | 40 | 300 | 42.2 | 1,000 | 40.9 | 300 | 39.4 | 300 | 38.9 | 300 | 38.1 |
| Toluene | 30 | 17 | 150 | 21.1 | 450 | 18.4 | 150 | 19.7 | 150 | 19.4 | 150 | 19.1 |
| Sum | 145 | 100 | 711 | 100 | 2,447 | 100 | 761 | 100 | 772 | 100 | 787 | 100 |

The viscosity of the resulting polymers was measured using a Rheometer (shear rate 1-25 s−1; temperature 25° C.).

The shore A hardness of the resulting polymers—after 7 days storage at 50% RH, 23° C.—was measured according to DIN ISO 7619-1.

The results are displayed in Table 2.

TABLE 2

| DMDA/DMDS | Viscosity [Pa · s] | Shore-A (5″) |
|---|---|---|
| no DMDS | 5.7 | 9 |
| 3.0 | 7.2 | 43 |
| 1.9 | 7.8 | 39 |
| 1.4 | 8.2 | 35 |
| 1.0 | 9.3 | 30 |
| 0.5 | 13 | 13 |

This table shows that a DMDA/DMDS ratio in the claimed range yields an optimum Shore A hardness and low viscosity. Low viscosity improves the applicability of the polymer by formulators.

Also the tensile strength and the elongation at break of the polymers was tested, after 7 days storage at 50% RH, 23° C. The tensile strength was tested using a Franz Wohl & Partner Prüfmaschinen GmbH tensile tester on 2±0.2 mm thick specimen in accordance to DIN 53 504. The tests of the specimen was conducted according to DIN 53 504 with a testing speed of 100 mm/min.

Table 3 shows that the polymers according to the invention have a greatly improved tensile strength.

TABLE 3

| DMDA/DMDS | Tensile strength [N/mm$^2$] | Elongation at break [%] |
|---|---|---|
| 3.0 | 0.96 | 85 |
| 1.9 | 0.95 | 103 |
| 1.4 | 0.89 | 119 |
| 1.0 | 0.70 | 115 |
| 0.5 | 0.50 | 272 |

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. Process for the production of a liquid mercapto-terminated polythioethersulfide comprising the step of reacting, at a temperature in the range 0-100° C. and in the presence of a catalyst:
    at least one compound selected from the group consisting of (i) dimercapto-dioxa-alkanes (DMDAs) of the formula HS—$(C_nH_{2n}$—$O)_p$—$C_nH_{2n}$—$O$—$C_nH_{2n}$—SH, wherein each n is independently selected from integers in the range 1-8, and p ranges from 0 to 10 and (ii) glycol di(mercapto carboxylic acid ester)s (GDMEs),
    at least one dimercapto-dialkyl sulfide (DMDS) of the formula HS—$(C_mH_{2m}$—$S)_q$—$C_mH_{2m}$—S—$C_mH_{2m}$—SH wherein each m is independently selected from integers in the range 1-8, and q ranges from 0 to 10,
    at least one di-epoxide, and
    optionally at least one branching agent selected from compounds having at least three terminal groups selected from epoxy and mercapto groups,
    wherein the molar ratio (DMDA+GDME)/DMDS is in the range 1.1-4.0.

2. The process according to claim 1, wherein the molar ratio (DMDA+GDME)/DMDS is in the range 1.5-3.0.

3. The process according to claim 1, wherein the at least one dimercapto-dioxa-alkane (DMDA) is used in the process.

4. The process according to claim 3, wherein the DMDA is selected from the group consisting of 1,8-dimercapto-3,6-dioxaoctane (DMDO), 1,7-dimercapto-3,5-dioxaheptane (DMDH), 1,7-dimercapto-3,5-dioxaheptane, hexa(ethylene glycol) dithiol, tetra(ethylene glycol) dithiol, and 2,2′-(propane-1,3-diylbis(oxy))diethanethiol.

5. The process according to claim 1 wherein the dimercapto-dialkyl sulfide (DMDS) is selected from the group consisting of 2,2'-dimercaptodiethyl sulfide, 3,5-dithia-1,7-heptanedithiol, 3,7-dithia-1,9-nonanedithiol, and 3,6,9-trithiaundecane-1,11-dithiol.

6. The process according to claim 1 wherein the branching agent is present, and is selected from compounds having three or four terminal groups selected from epoxy and mercapto groups.

7. The process according to claim 6 wherein the branching agent is selected from the group consisting of triglycidyl ether trimethylol propane, glycerol triglycidyl ether, trimethylolpropane (3-mercaptopropionate), and 2,3-bis((2-mercaptoethyl)thio)-1-propanethiol, and pentaerythrityl tetrathiol.

8. The process according to claim 1 wherein the amount of branching agent ranges from 5 to 25 mol % relative to the total molar amount of DMDA, GDMA, DMDS, and branching agent.

9. The process according to claim 1 wherein the di-epoxide is an aliphatic di-epoxide.

10. The process according to claim 1, wherein each m is independently selected from integers in the range 1 to 3.

11. The process according to claim 1, wherein the DMDA comprises DMDO.

12. The process according to claim 1, wherein the catalyst is selected from the group consisting of tertiary amines, tertiary phosphines, imidazoles, and lewis acids.

13. A mercaptoterminated polythioethersulfide made by the process of claim 1.

14. A composition comprising
at least one compound selected from the group consisting of (i) dimercapto-dioxa-alkanes (DMDAs) of the formula HS—$(C_nH_{2n}—O)_p$—$C_nH_{2n}$—O—$CH_{2n}$—SH, wherein each n is independently selected from integers in the range 1-8, and p ranges from 0 to 10 and (ii) glycol di(mercapto carboxylic acid ester)s (GDMEs), at least one dimercapto-dialkyl sulfide (DMDS) of the formula HS—$(C_mH_{2m}—S)_q$—$C_mH_{2m}$—S—$C_mH_{2m}$—SH wherein each m is independently selected from integers in the range 1-8, and q ranges from 0 to 10, and
at least one di-epoxide,
wherein the molar ratio (DMDA+GDME)/DMDS is in the range 1.1-4.0.

15. The composition according to claim 14, further comprising at least one branching agent selected from compounds having at least three terminal groups selected from epoxy and mercapto groups.

16. The composition according to claim 14, wherein the molar ratio (DMDA+GDME)/DMDS is in the range 1.5-3.0.

17. The composition according to claim 14, comprising a DMDA selected from the group consisting of 1,8-dimercapto-3,6-dioxaoctane (DMDO), 1,7-dimercapto-3,5-dioxaheptane (DMDH), 1,7-dimercapto-3,5-dioxaheptane, hexa(ethylene glycol) dithiol, tetra(ethylene glycol) dithiol, and 2,2'-(propane-1,3-diylbis(oxy))diethanethiol.

18. The composition according to claim 14, wherein the dimercapto-dialkyl sulfide (DMDS) is selected from the group consisting of 2,2'-dimercaptodiethyl sulfide, 3,5-dithia-1,7-heptanedithiol, 3,7-dithia-1,9-nonanedithiol, and 3,6,9-trithiaundecane-1,11-dithiol.

19. The composition according to claim 14, wherein the amount of branching agent ranges from 5 to 25 mol % relative to the total molar amount of DMDA, GDMA, DMDS, and branching agent.

20. A liquid mercapto-terminated polythioethersulfide made by reacting, at a temperature in the range 0-100° C. and in the presence of a catalyst, a composition according to claim 14.

* * * * *